US007916129B2

(12) United States Patent
Lin et al.

(10) Patent No.: US 7,916,129 B2
(45) Date of Patent: Mar. 29, 2011

(54) INTERACTIVE DISPLAY SYSTEM (75) Inventors: Ying-Tzu Lin, Hsinchu (TW);
Yung-Chin Hsiao, Taipei (TW); Yu-Kai Chen, Chiayi (TW); Sen Lee, Taipei Hsien (TW); Bou-Chih Yang, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 935 days.

(21) Appl. No.: 11/467,927

(22) Filed: Aug. 29, 2006

(65) Prior Publication Data
US 2008/0055730 A1 Mar. 6, 2008

(51) Int. Cl.
*G06F 3/038* (2006.01)
(52) U.S. Cl. ............. 345/204; 345/156; 348/61; 348/63
(58) Field of Classification Search .................. 345/204, 345/156, 61; 235/462.36; 348/61, 63; 386/46
See application file for complete search history.

(56) References Cited

U.S. PATENT DOCUMENTS

| 6,275,258 | B1 * | 8/2001 | Chim ................ 348/211.12 |
| 7,133,003 | B2 * | 11/2006 | Allen et al. ................ 345/32 |
| 7,283,106 | B2 * | 10/2007 | Allen et al. ................ 345/32 |
| 2001/0031081 | A1 * | 10/2001 | Quan et al. ................ 382/154 |
| 2002/0196333 | A1 * | 12/2002 | Gorischek ................ 348/61 |
| 2004/0246272 | A1 * | 12/2004 | Ramian ................ 345/660 |
| 2005/0185278 | A1 | 8/2005 | Horsten et al. |
| 2005/0206610 | A1 * | 9/2005 | Cordelli ................ 345/156 |
| 2006/0164725 | A1 | 7/2006 | Horsten et al. |
| 2006/0262187 | A1 * | 11/2006 | Takizawa ................ 348/77 |
| 2007/0040033 | A1 * | 2/2007 | Rosenberg ................ 235/462.36 |
| 2008/0030459 | A1 * | 2/2008 | Kouno ................ 345/156 |

FOREIGN PATENT DOCUMENTS
JP 04070899 A * 3/1992
JP 07181939 A * 7/1995
* cited by examiner

*Primary Examiner* — Amare Mengistu
*Assistant Examiner* — Koosha Sharifi
(74) *Attorney, Agent, or Firm* — Jianq Chyun IP Office (57) ABSTRACT

An interactive display system is introduced herein. The interactive display system includes a mirror and a display unit. The display unit is built in the mirror, for providing auxiliary showing an image of a user in front of the display system. The image of the user can be automatically enlarged or shrunk and displayed on the display unit when the user moves forward to or away from the interactive display system.

7 Claims, 9 Drawing Sheets

INTERACTIVE DISPLAY SYSTEM

BACKGROUND OF THE INVENTION

1. Field of Invention

The present invention relates to an interactive display system, and more particularly to an integrated interactive display system including a mirror embedded with a display unit, which can reflect image of an object directly and display enlarged or shrunk images of an object simultaneously.

2. Description of the Related Art

With development of high technology, imaging devices have been becoming a common product in daily life. Users may read information via display systems and further choose specific information by a control device such as touch pannels on the display systems. The display system can be implemented and embedded in a mirror for providing information. If the display system is not activated, the top surface of the display can be used just as a part of the mirror for reflecting the object in front of the mirror.

Figure 1A:
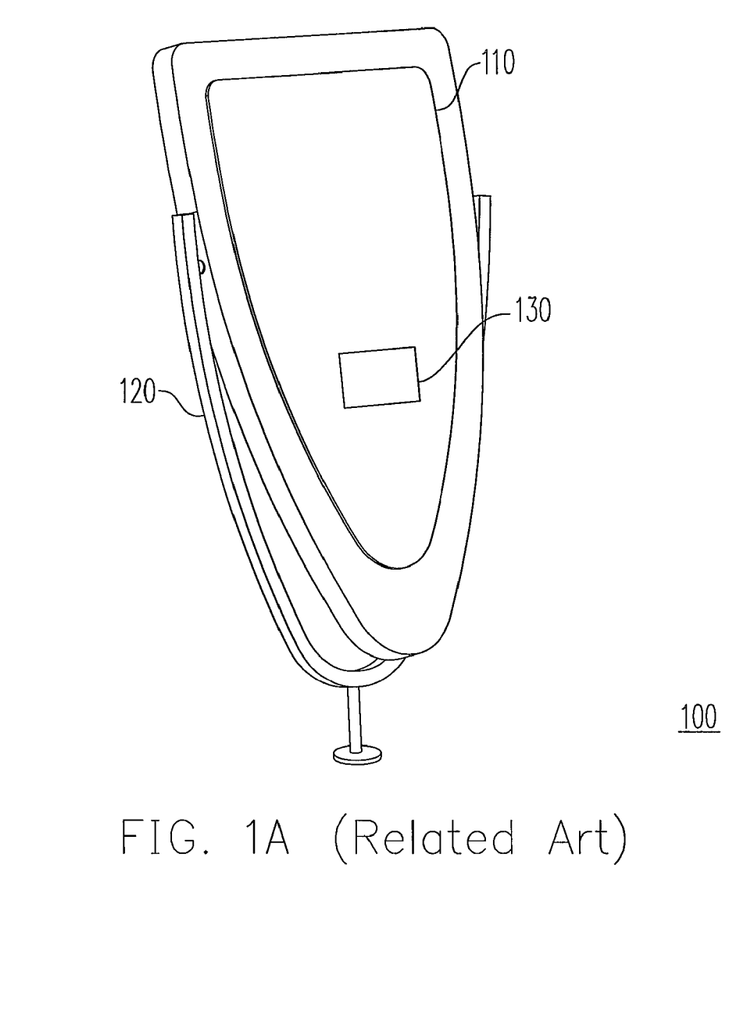
FIG. 1A shows a conventional mirror display system including a mirror embedded with a display device.

Refer to FIG. 1A, which shows a conventional mirror display system including a mirror embedded with a display device. The mirror display system 100 includes a mirror body 110, a support 120 for supporting rotational movement of the mirror body 110, and a display device 130 embedded in the mirror body 110 for displaying information by a video program. In the mirror display system 100, the video program is continuously displayed in the display device 130 for advertisement. As disclosed in US Patent Application No. 2002/0196333A1, which is entitled "Mirror and image display system", discloses a vanity console including a mirror, an image display and a touch screen positioned on the mirror for the use of the image display. The related arts about a display built in a mirror can be found in the US Patent Publication No. 2006/0164725 proposed by Koninklijke Philips Electronics N.V., entitled "Mirror with built in display", or in the US Patent Publication No. 2006/0185278 proposed by Koninklijke Philips Electronics N.V., also entitled "Mirror with built in display", all disclosures are incorporated herein for reference herewith.

Figure 1B:
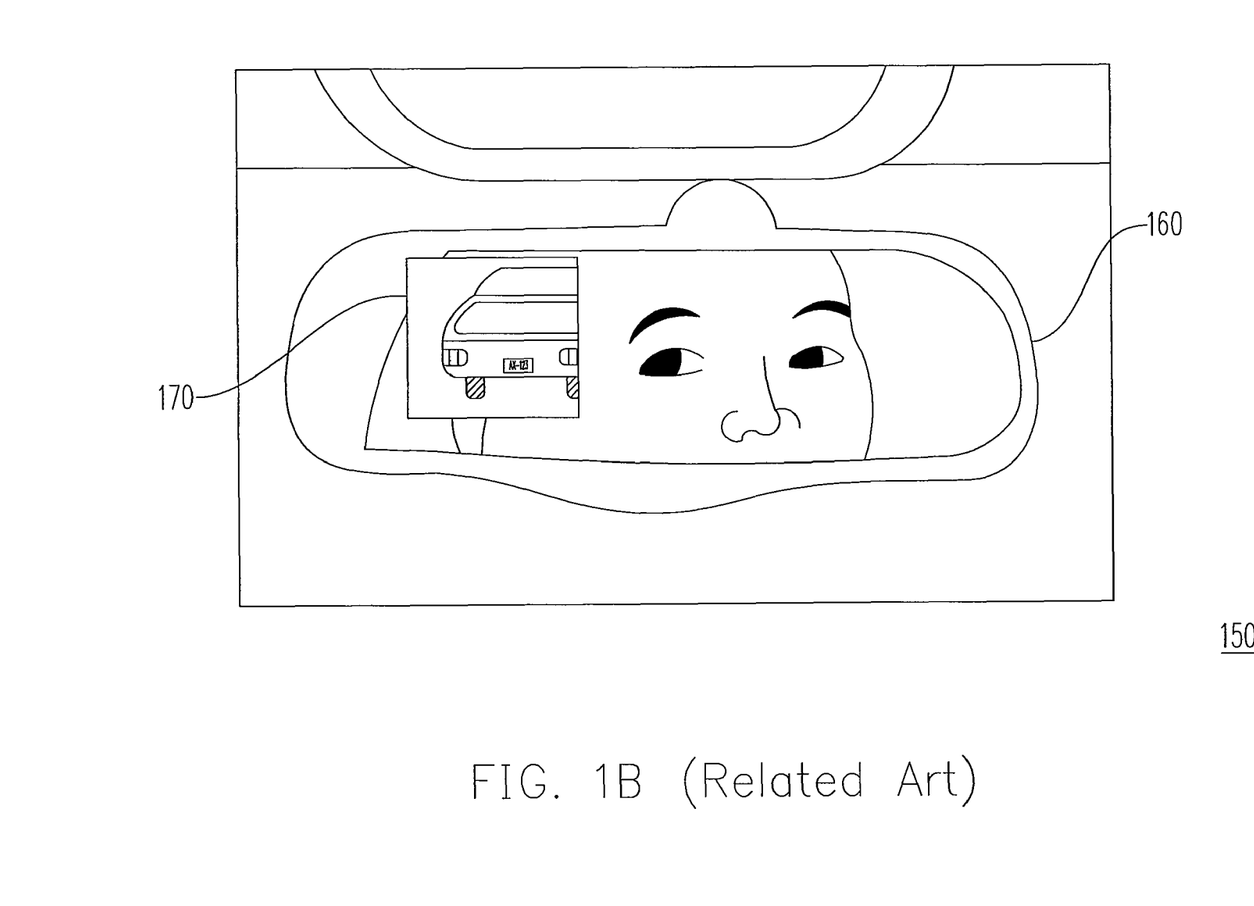
FIG. 1B shows a conventional mirror display system including a mirror embedded with a display device, which is applied to car industries.

Another mirror display system including a mirror embedded with a display device can be also applied to car industries, which is adaptive to be an interior rearview mirror. As shown in FIG. 1B, the mirror display system 150 includes a rearview mirror body 160 embedded with a display device 170. The display device 170 can show the rearview of the vehicle to the driver by using image capture devices disposed on the rear of the vehicle.

Figure 2:
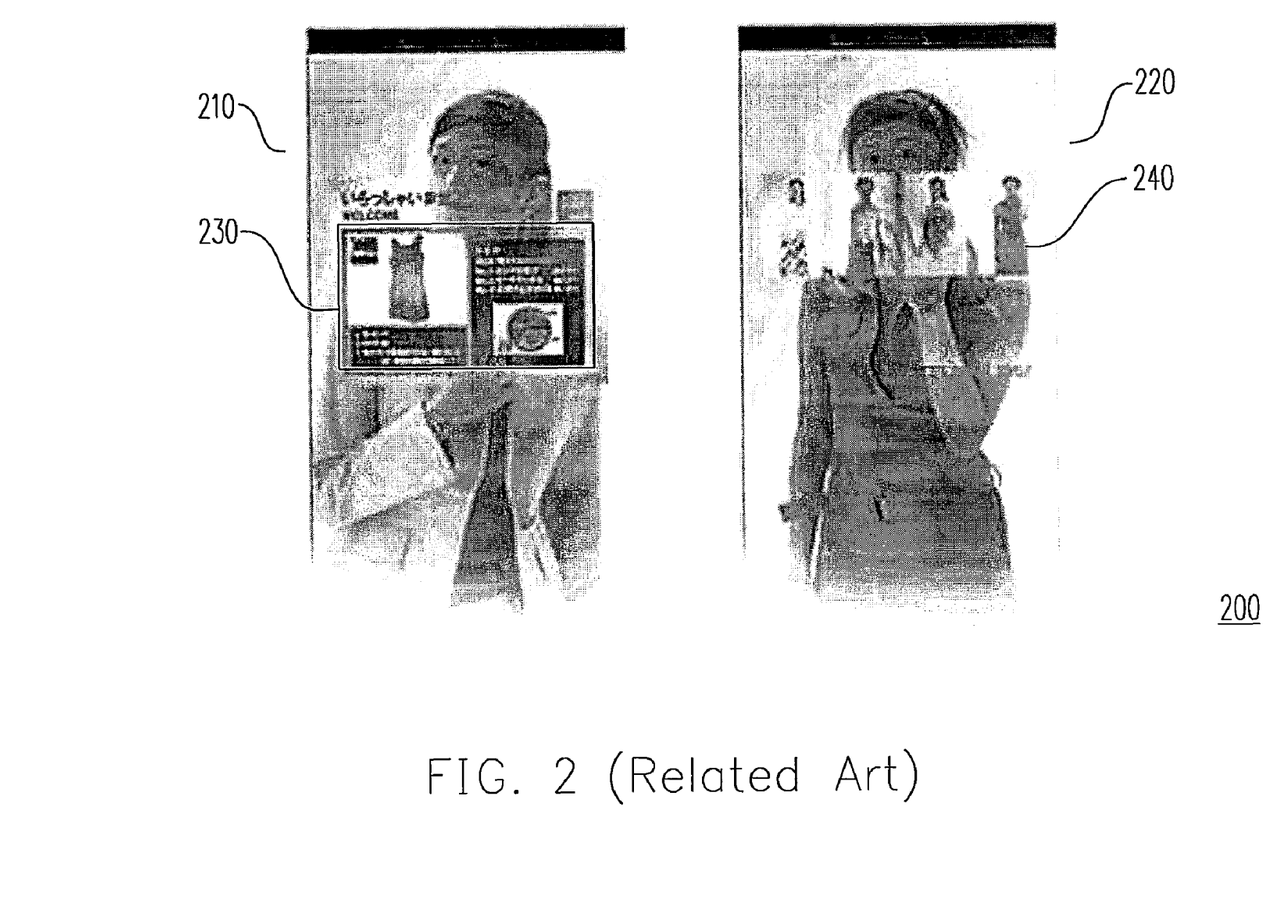
FIG. 2 shows another mirror display system including a mirror embedded with a display device and an radio frequency identification (RFID).

Another mirror display system including a mirror embedded with a display device and an radio frequency identification (RFID) is shown in FIG. 2, developed by a Japanese company, Hitachi Inc. The mirror display system 200 includes a mirror 210 or 220, an LCD projection 230 or 240, and an RFID receiver (not shown). When a customer wearing or bringing a product stands near the mirror display system 200, the mirror display system 200 will automatically display corresponding digital contents based on the identities from the RFIDs of the product. For example, as shown in FIG. 2, when the customer chooses a suit of clothes to try on, the mirror display system 200 will show the customer wearing the suit of the clothes in the mirror 210 or 220 and the corresponding information about the suit of the closes or other options for the customer simultaneously. The mirror display system 200 can be used in shops and stores.

Most of the mirror display systems are developed for commercial purposes or for advertisement, however, the mirror display systems disclosed in the prior art do not focus on improving the convenience of users. For example, it is often inconvenient for a person to use the mirror disposed away from him because of a wash-basin located in front of the mirror. Especially when the person is short-sighted and putting on make-up or washing face without wearing glasses, it is difficult for him to see a clear image displayed in the mirror because the mirror is located in a distance away from him.

SUMMARY OF THE INVENTION

The present invention provides an interactive display system. A display embedded in a mirror for providing auxiliary showing of an enlarged or a shrunk image of an object in front of the mirror.

The present invention provides an interactive display system including a mirror embedded with a display unit, which when an user stands or sits in front of the display system, the image of the user can be automatically enlarged or shrunk and displayed on the display unit embedded in the mirror when the user moves forward to or away from the interactive display system.

In an alternative embodiment, the portion of the user's body to be enlarged and shown on the display unit can be determined by the user's commands. Furthermore, the enlarging and shrinking ratio also can be determined by user's commands. In one embodiment, the commands can be given through a control device such as a touch screen/touch panel on the interactive display system.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

The present invention provides an interactive display system. A display unit is embedded in a mirror for providing auxiliary showing of an enlarged or a shrunk image of an object in front of the interactive display system. The display unit can be a liquid crystal display (LCD), a light emitting diode (LED) display, a vacuum fluorescent display (VFD), a plasma display (PDP), an organic light emitting display (OLED) or a field emission display (FED) and the like. In one embodiment, the interactive display system further includes a control device such as a touch pannel for the user to give commands or select modes of the display.

When a user stands or sits in front of the interactive display system, the image of the user can be automatically enlarged or shrunk and displayed on a display unit embedded in the mirror when the user moves forward to or away from the interactive display system. For example, when the user moves forward close to the mirror for putting on make-up or wearing contact lenses, the image shown on the display unit will be automatically enlarged for user's convenience. The reflected image of the user and the enlarged partial image of the user can be displayed at the same time and facial features can be clearly seen through the enlarged image displayed on the display unit. When the user moves away from the interactive display system for a full view of the whole body, the image shown on the display unit will be automatically shrunk. The reflected image of the user and the shrunk image of the user can be displayed at the same time and a full view of the whole body can be clearly seen on the display unit.

The interactive display system of the present invention includes one or a plurality of image capture devices such as cameras for capturing images of the user in front of the interactive display system. Ordinarily, the captured image is displayed by the display unit directly, that means the display unit behaves as a part of the mirror and user may not notice the presence of the display unit. Otherwise, through an image data processing operation conducted in an image processing unit, the captured images can be enlarged or shrunk and displayed on the display unit. The operation of enlarging or shrinking images can be done in reponse to the movement of the user in front of the interactive display system. In an alternative embodiment, the operation of enlarging or shrinking images can be done in reponse to an user's commands. Besides, the portion of the user's body to be enlarged and shown on the display unit, such as his right face or his nose, and the enlarging/shrinking ratio of images shown on the display unit also can be determined according to the commands given by the user.

The interactive display system of the present invention further includes one or a plurality of distance sensors for detecting distance variation between the user and the display system in order to decide how the image to be shown on the display unit. By an automatic manner, in one case that when the user moves forward close to the display system, the distance sensor detects the user being moving forward, the captured image of the user is enlarged and displayed on the display unit. If the user moves closer to the display system, it means that the enlarging ratio of the captured image is not enough for the user, then the captured image of the user is enlarged again with a larger enlarging ratio and displayed on the display unit. On the contrary, if the user is moving away from the display system, the captured image of the user is shrunk and displayed on the display unit. If the user moves further away from the display system, it means that the shrinking ratio of the captured image is not enough for the user, then the captured image of the user is shrunk again with a larger shrinking ratio and displayed on the display unit.

In an alternative embodiment, the user can choose to display enlarged or shrunk image through a control device such as a touch panel. By an user mode selection manner, if the user intends to obtain a much enlarged portion of the image, the user can select the enlarging ratio as desired through control device such as a touch panel on the interactive display system. If the user intends to obtain a full view of the whole body, the user can also select the shrinking ratio as desired through control device.

Figure 3A:
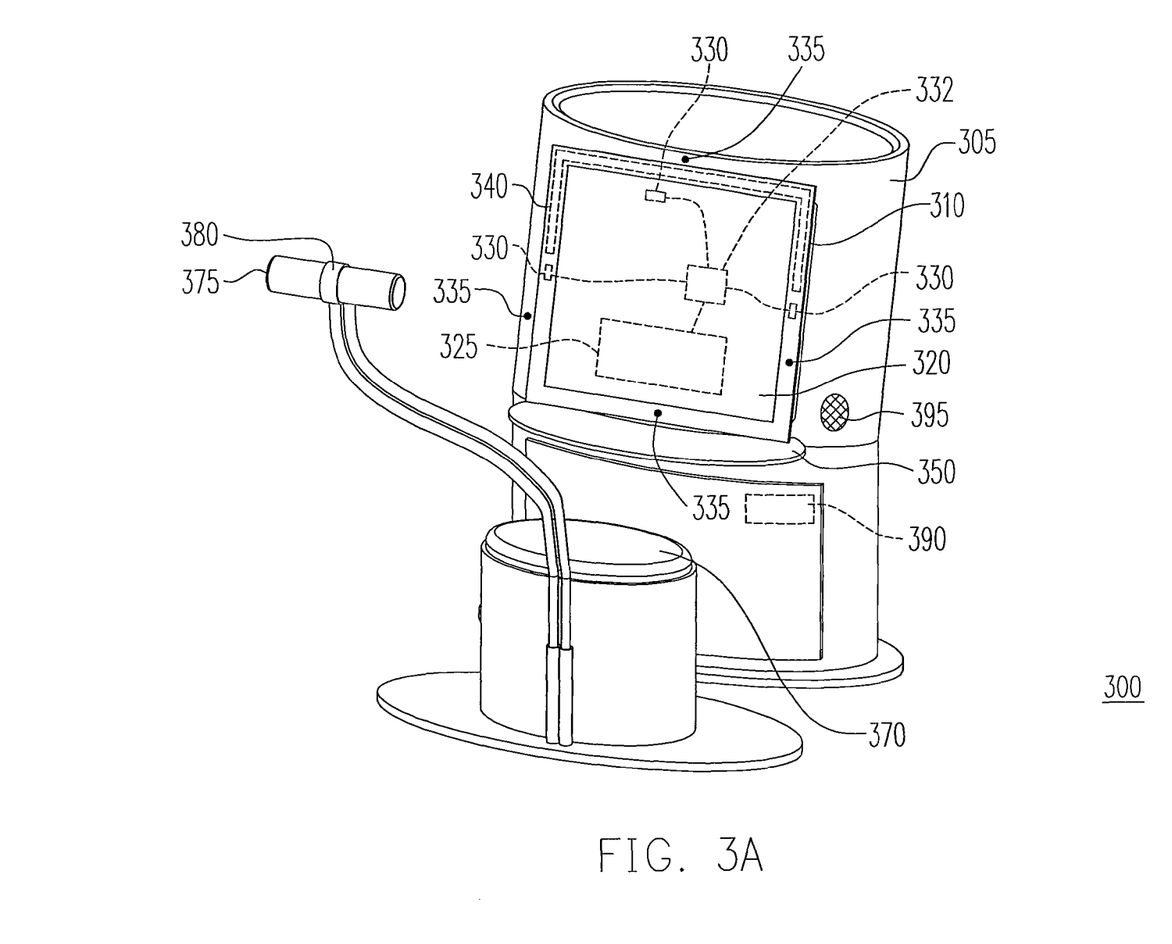
FIGS. 3A~3C show perspective views of a preferred embodiment of an interactive display system of the present invention.

The interactive display system of the present invention further includes one or a plurality of behind cameras disposed behind the user. In one example, the behind cameras are disposed in an chair located in front of the interactive display system, which is shown in FIGS. 3A and 3C. In another embodiment, the behind cameras 380 are disposed in one part 307 extending from the main body 305. The corresponding interactive display system 300A is shown in FIG. 3D. In another example, the behind camera can be disposed in a wall behind the user, which depends on the design. The behind camera captures an rear image of the user which can be shown on the display unit if the user selects the mode for showing the rear view of the user. It is very convenient for the user to see the rear view of the body, for example, when the user is trying to buckle the buttons or wear a necklace.

The interactive display system of the present invention further includes a scene light source, for providing a light source simulating some specific environments, such as a party scene, an office scene, an outdoor scene and various light settings showing different weather conditions. The simulated lighting condition is convenient for the user to put on make-up properly. In one embodiment, the scene light source can be disposed on a portion of a rim of the mirror.

Figure 3B:
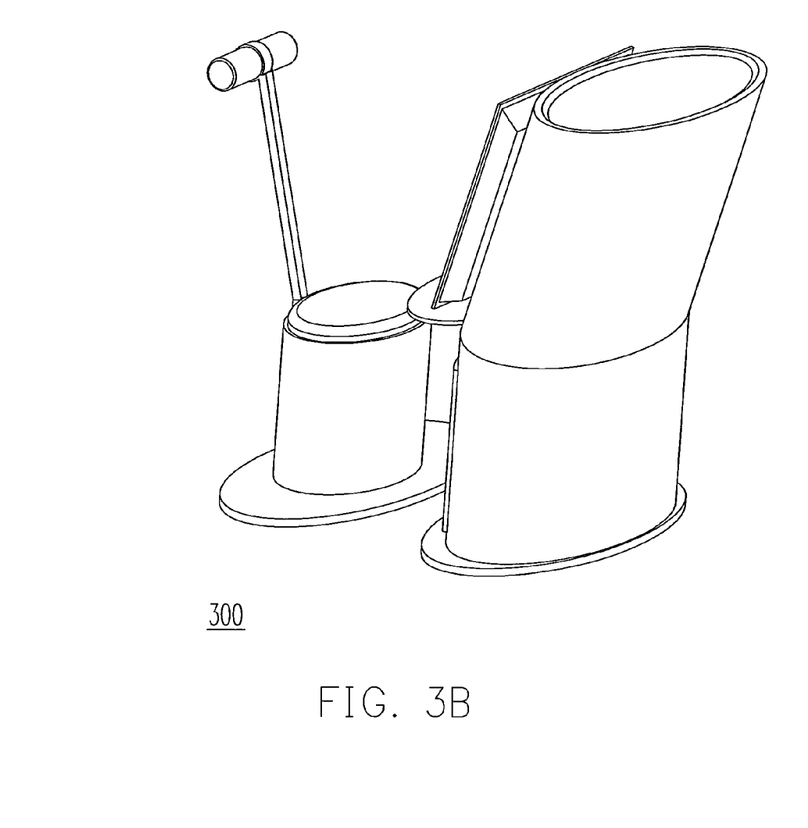
Figure 3C:
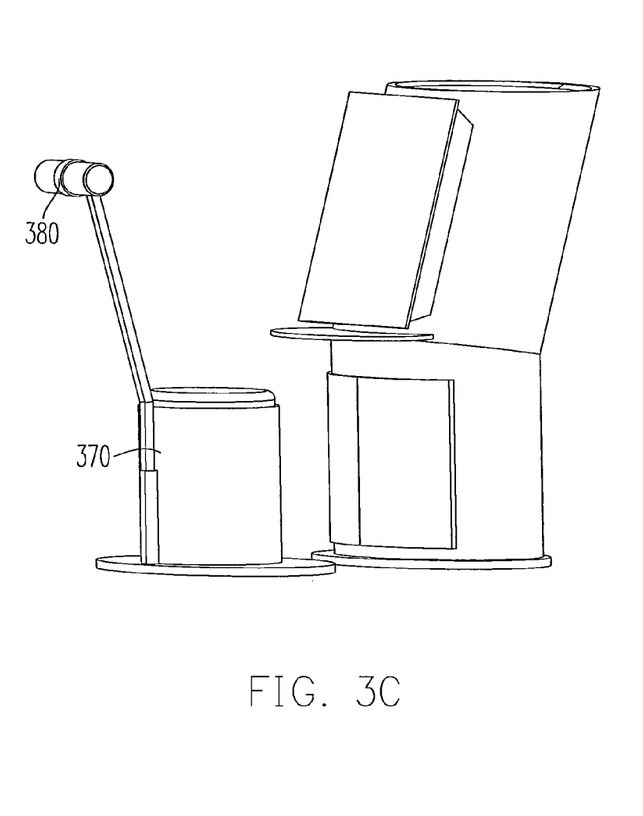
Figure 3D:
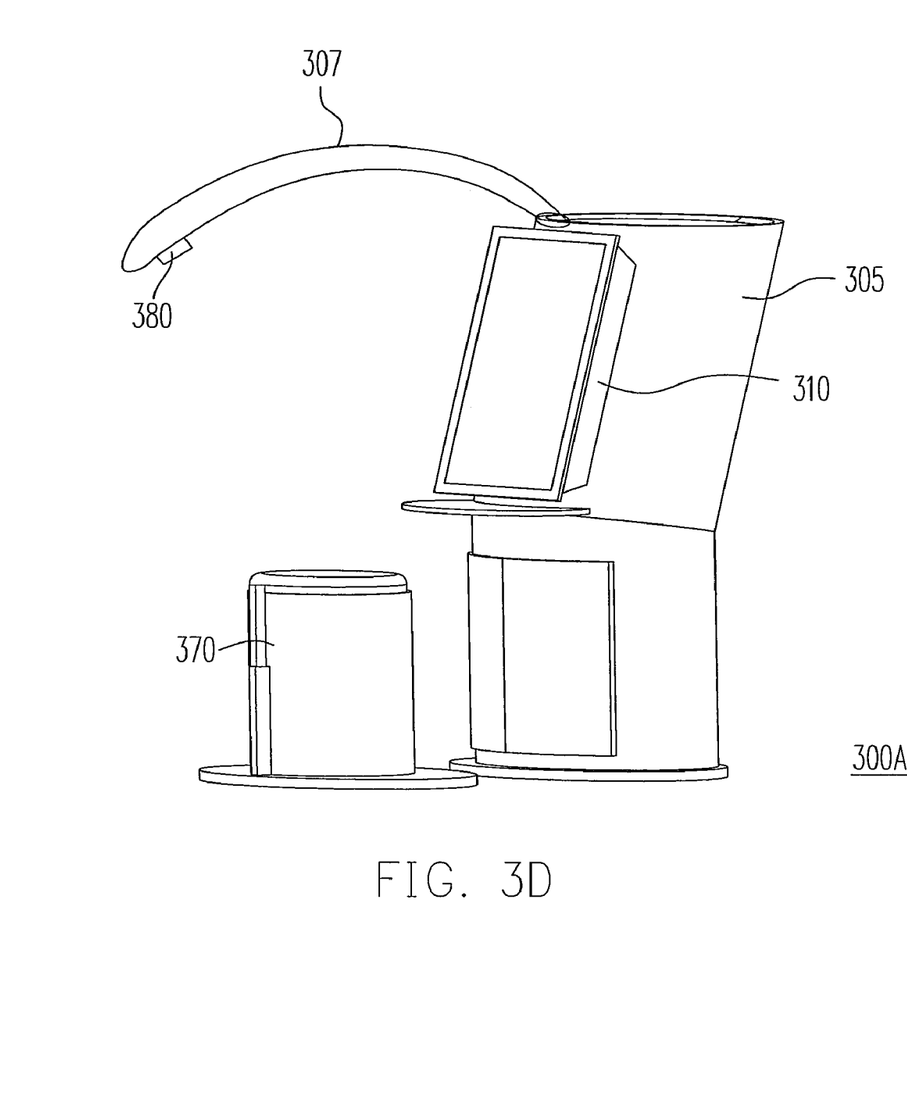
FIG. 3D shows a perspective view of another preferred embodiment of an interactive display system of the present invention.

Please refer to FIGS. 3A-3C, which show respective views of a preferred embodiment of an interactive display system of the present invention. As shown in FIG. 3A, the interactive display system 300 is disposed in a main body 305. The main body includes a desktop 350 and a chair 370 with a back support 375, which is disposed in front of the main body 305. The interactive display system 300 includes an mirror 320 disposed in a frame 310, a plurality of cameras 330 disposed on the frame 310 or on the mirror 320, and a light source 340. A display unit 325 is built within the mirror 320. The interactive display system 300 further includes a behind camera 380 for capturing rear-view image of the user. The interactive display system 300 further includes a plurality of distance sensors 335 surrounding the mirror 320 for sensing several distance variations in different angles between the user and the interactive display system 300.

These cameras 330 in a front side of the interactive display system 300 capture images of the user in front of the mirror 320. The captured images will be displayed on the display unit 325, and by an image data processing operation in an image processing unit 332 connected to the cameras 330 and the display unit 325, the captured images can be easily enlarged or shrunk in reponse to the movement of the user or based on the user's commands.

In the interactive display system, when the user moves forward close to the display system, the distance sensors 335 detect the user being moving forward, the captured image of the user is enlarged and displayed on the display unit 325. If the user moves closer, the captured image of the user is enlarged again with a larger enlarging ratio and displayed on the display unit. On the contrary, if the user is moving away from the display system 300, the captured image of the user is shrunk and displayed on the display unit 325. If the user moves further away, the captured image of the user is shrunk again with a larger shrinking ratio and displayed on the display unit.

In a further application, while a portion of the user's body is moving forward to the mirror 320, for example, the right side of the user's face, the distance sensor 335 on the right side can sense the part of the user moving closer to the mirror 320 and then the camera 330 can focus on capturing the corresponding portion of the user for enlarge display on the display unit. The interactive manner is very convenient for the user.

The light source 340 is a scene simulating light source, for providing a light source simulating some specific environments, such as a party scene, an office scene, an outdoor scene and various light settings showing different weather conditions. The interactive display system 300 further includes an audio player 390 such as a CD player or a MP3 player, for providing sounds and background music from a speaker 395 based on the user's commands.

Figure 4:
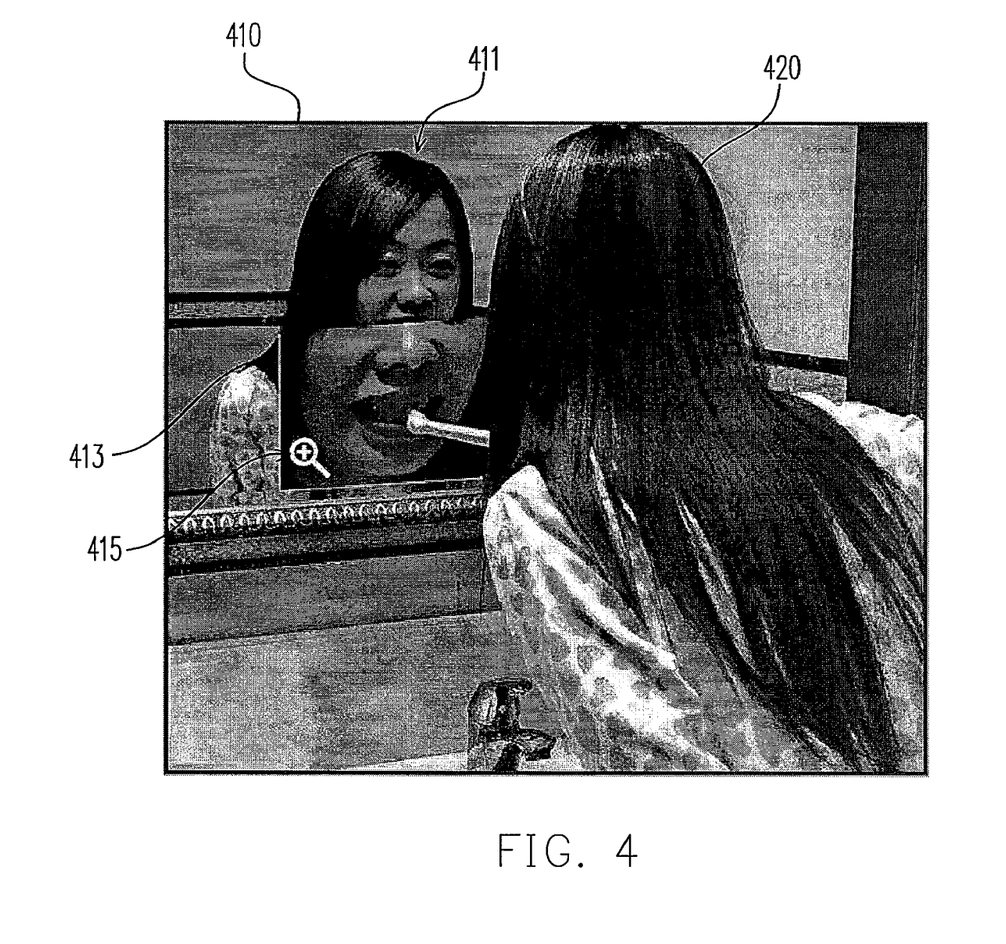
FIGS. 4-5 shows an implementation embodiment of an interactive display system of the present invention in different modes.

Please refer to FIG. 4, which shows an implementation embodiment of an interactive display system of the present invention. The interactive display system includes an mirror 410 with a display unit 413 built within. When the user 420 moves forward for brushing her teeth, not only the image 411 reflected directly by the mirror 410 but also a portion of the user 420 is enlarged and displayed on the display unit 413 at the same time. The interactive display system can further include a control device such as a touch bottom 415 for the user 420 to apply commands for further enlargement or shrinkage of the image shown in the display 413.

In the case that the user is brushing her teeth, she is desiring to get an enlarged portion of her face. While the interactive display system is operating in an automatical manner, if the user is moving forward to the mirror 410, the enlarging ratio is increased and, on the contrary, if the user is moving away from the mirror 410, the enlarging ratio is decreased. If the interactive display system is operating in an user mode selection manner, because the user is desiring to get an enlarged portion of her face, the user can select the enlarging ratio as desired by, for example, through a touch screen.

Figure 5:
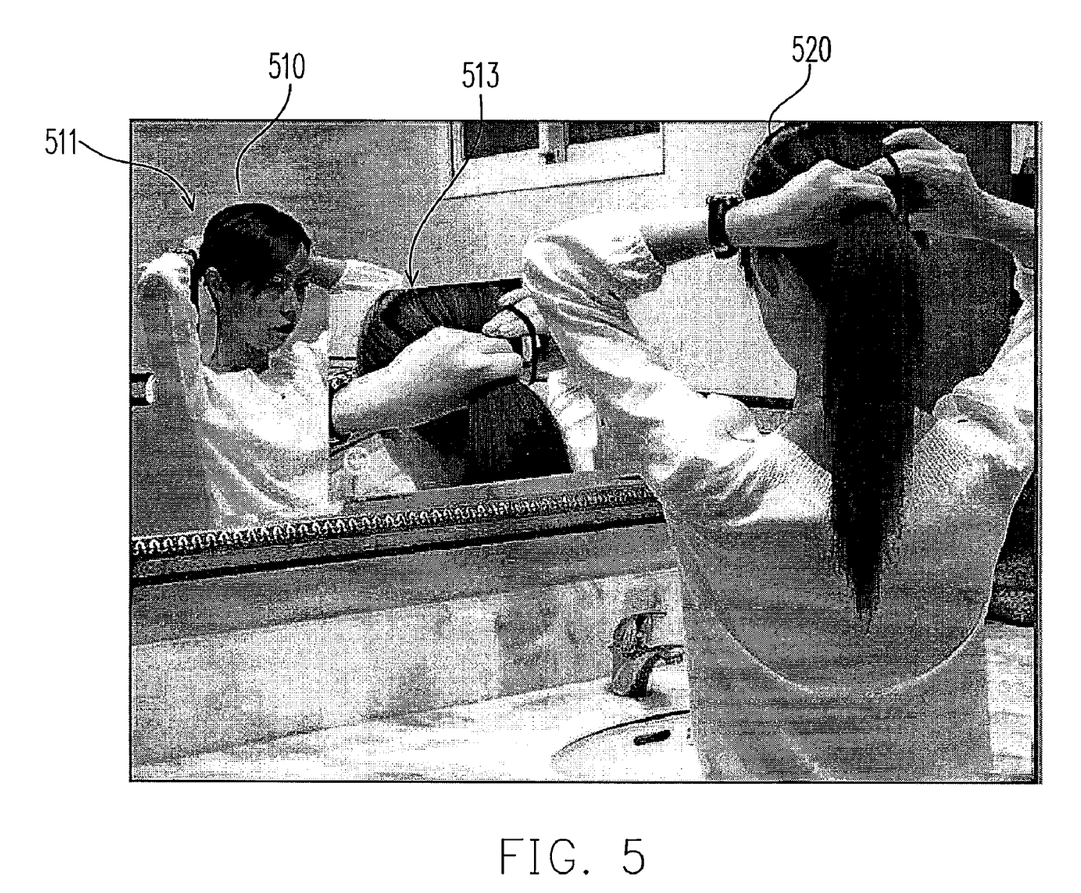

Please refer to FIG. 5, which shows the implementation embodiment of an interactive display system in a different mode. By the user's commands, the rear view of the user 520 is shown on the display 513 built in the mirror 510. If the user 520 try to plait her hair, it is very convenient for the user 520 to look at the rear view image displayed on the display unit.

Figure 6:
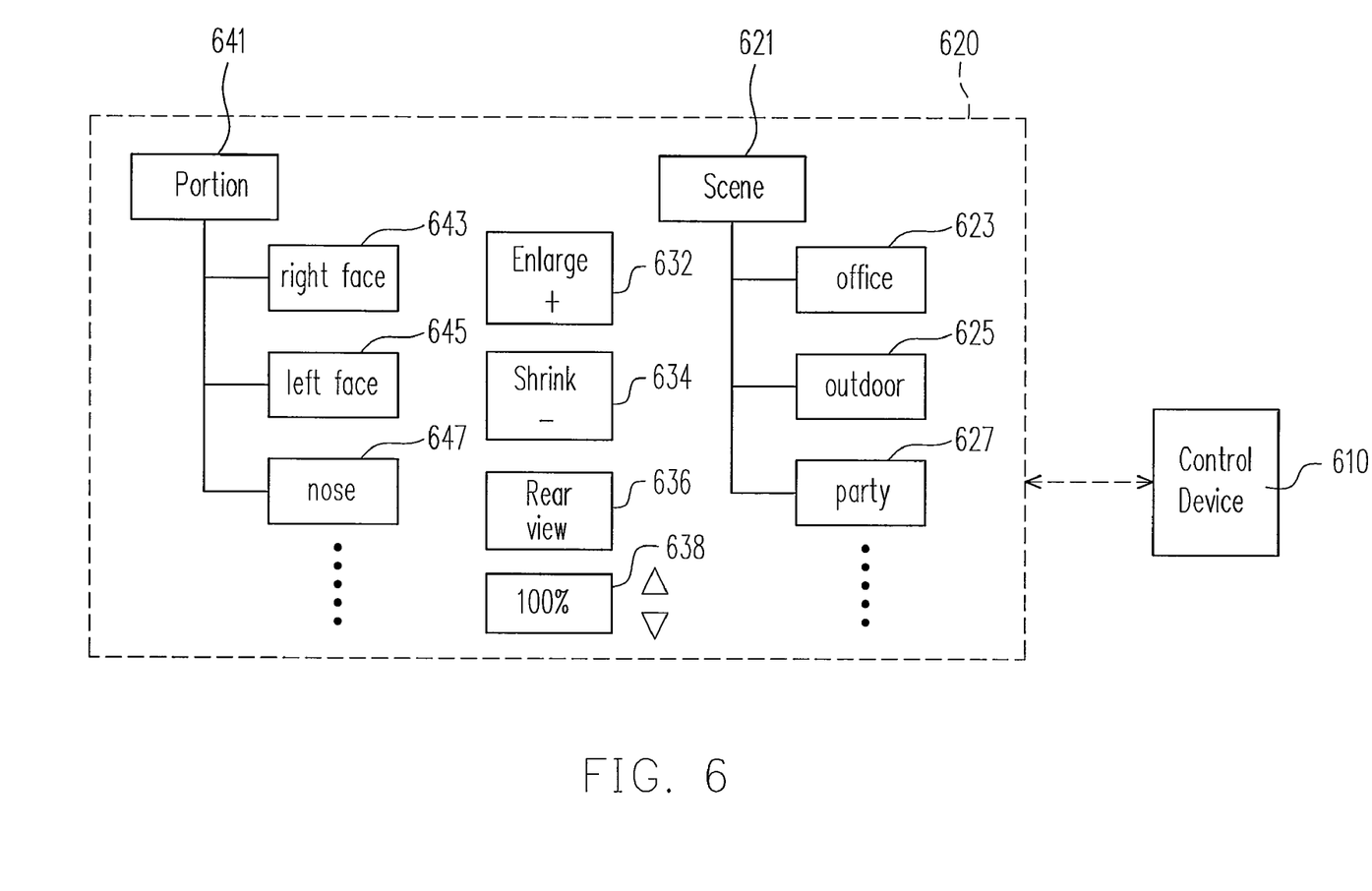
FIG. 6 shows another implementation embodiment of an interactive display system of the present invention.

Please refer to FIG. 6, which shows another implementation embodiment of an interactive display system of the present invention. The interactive display system of the present invention includes a control device 610 comprising a touch screen 620. In the touch screen 620, a plurality of options can be selected for different modes, for example, the option by the reference number 621 indicates an menu for locations, and options of the locations includes "office", "outdoor", "party", and etc. If the user selects the item "office", the selected command is transmitted to the control device 610 and a light source of the interactive display system will be adjusted to simulate the environment at the office scene. The simulated environment can provide the user, for example, to do some suitable make-up for an interview at the office.—In the touch screen 620, further options can be selected for different commands, for example, an enlarge option(+) 632 and a shrink option(−) 634 are provided for respectively enlarging/shrinking the displayed image. An option "rear view" is provided for displaying the user's rear view. A further option for selecting the ratio of enlarging or shrinking by percentage (%) is provided for changing the ratio of enlarging or shrinking. In the embodiment, the touch screen 620 includes more options for image display. For example, a menu for partially enlarging the image captured, as referenced as "portion" 641 in FIG. 6. The options for partially display includes a right face option 643, a left face option 645, a nose option 647, and etc. If the user intends to obtain an enlarged portion of the image, for example, the nose of the user, he can select the command "nose option" 647 as desired and then the command will be sent to the control device 610 of the interactive display system. The portion of the nose of the captured image will be enlarged at a larger enlarge ratio and the user can obtain the image he desired.

It will be apparent to those skilled in the art that various modifications and variations can be made to the structure of the present invention without departing from the scope or spirit of the invention. In view of the foregoing, it is intended that the specification and examples to be considered as exemplary only, with a true scope and spirit of the invention being indicated by the following claims and their equivalents.

What is claimed is:

1. An interactive display system, comprising:
a mirror; and
a display unit, built in the mirror, for providing auxiliary showing of an image of a user in front of the interactive display system;
an image capture device for capturing the image of the user;
a distance sensor for sensing a distance variation between the user and the interactive display system,
an image processing unit, connected to the image capture device and the display unit, for conducting an image data processing operation on the captured image for enlarging or shrinking the captured image according to a movement of the user sensed by the distance sensor, and the display unit displays the processed image, and
a control device, receiving commands in response to a touching event by the user of a touching interface, to change a ratio of enlarging or shrinking in response to the movement of the user relative to the display unit,
wherein when the user moves forward close to the display system, the distance sensor detects the user being moving forward, and the captured image of the user is enlarged by the ratio received from the control device and displayed on the display unit, and when the user moves away from the display system, the captured image of the user is shrunk by the ratio received from the control device and displayed on the display unit.

2. The interactive display system as claimed in claim 1, wherein the image capture device further comprises an image capture unit disposed behind the user.

3. The interactive display system as claimed in claim 1, further comprising a control device for receiving commands given by the user to enlarge or shrink the image displayed on the display unit, or to show a rear view of the user, or to change the ratio of enlarging or shrinking.

4. The interactive display system as claimed in claim 1, further comprising a control device for receiving commands given by the user to determine a portion of the user's body to be enlarged and displayed on the display unit.

5. The interactive display system as claimed in claim 1, further comprising a control device for receiving commands given by the user to change light sources for simulating a scene selected by the user.

6. The interactive display system as claimed in claim 1, further comprising a pair of distance sensors disposed on a left side and a right side of the mirror, for sensing a distance variation between the user and the interactive display system.

7. An interactive display system, comprising:
a mirror positioned for capturing an image of a user in front of the mirror;
a display unit, built in the mirror, for providing auxiliary showing of an image of a user;
a plurality of image capture devices positioned in different directions relative to the user for capturing a plurality of images of the user from different angles;
a distance sensor for sensing a distance variation between the user and the display unit; and an image processing unit, connected to the image capture devices and the display unit, for conducting an image data processing operation on the captured images for selecting one from the captured images and enlarging or shrinking the selected one of the captured images according to a movement of the user sensed by the distance sensor, and the display unit displays the processed image, and a control device, receiving commands in response to a touching event by the user of a touching interface, to change a ratio of enlarging or shrinking in response to the movement of the user relative to the display unit, wherein when the user moves forward close to the display unit, the distance sensor detects the user being moving forward, and the captured image of the user is enlarged by the ratio received from the control device and displayed on the display unit, and when the user moves away from the display unit, the captured image of the user is shrunk by the ratio received from the control device and displayed on the display unit.

* * * * *